UNITED STATES PATENT OFFICE.

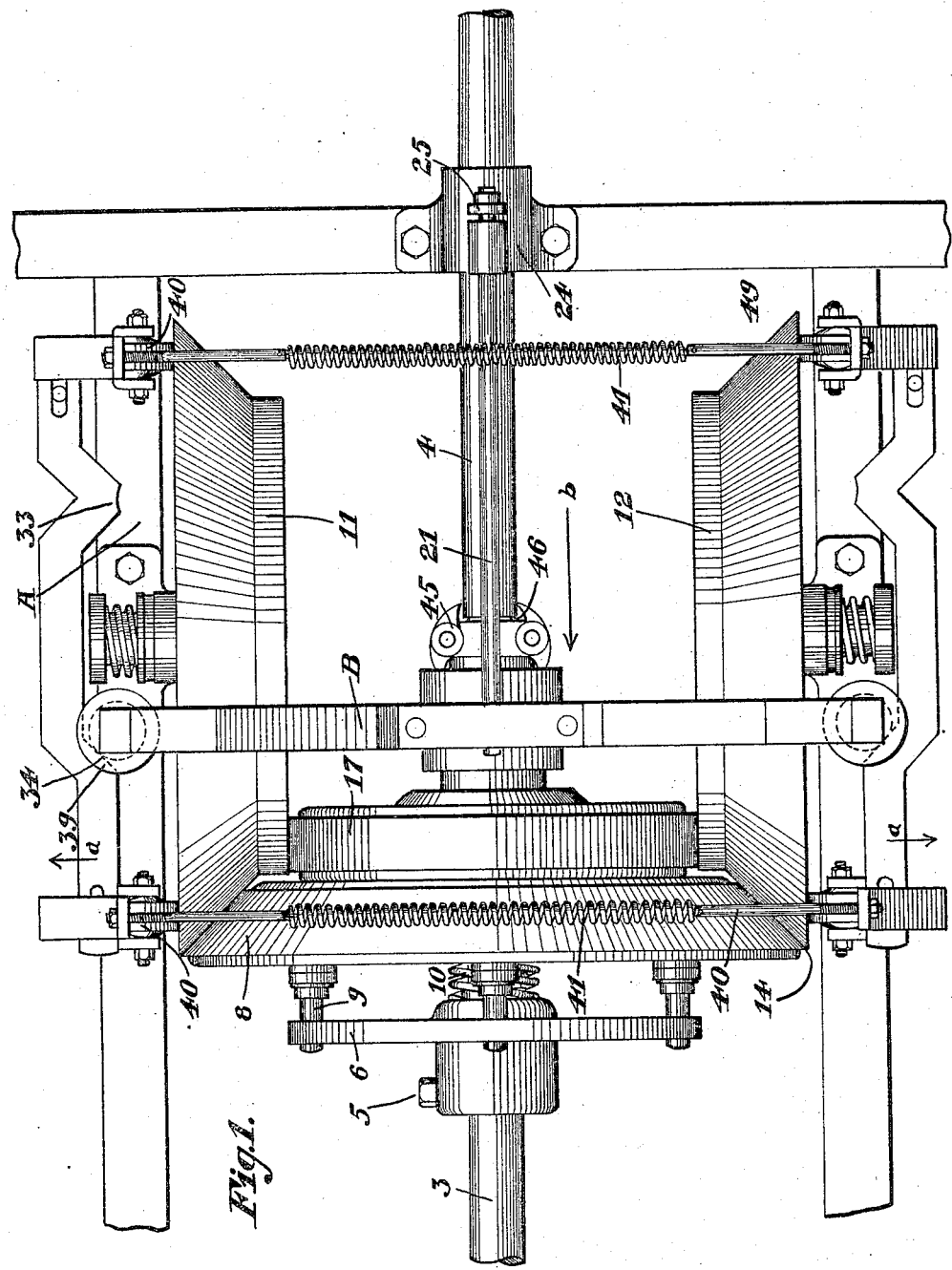

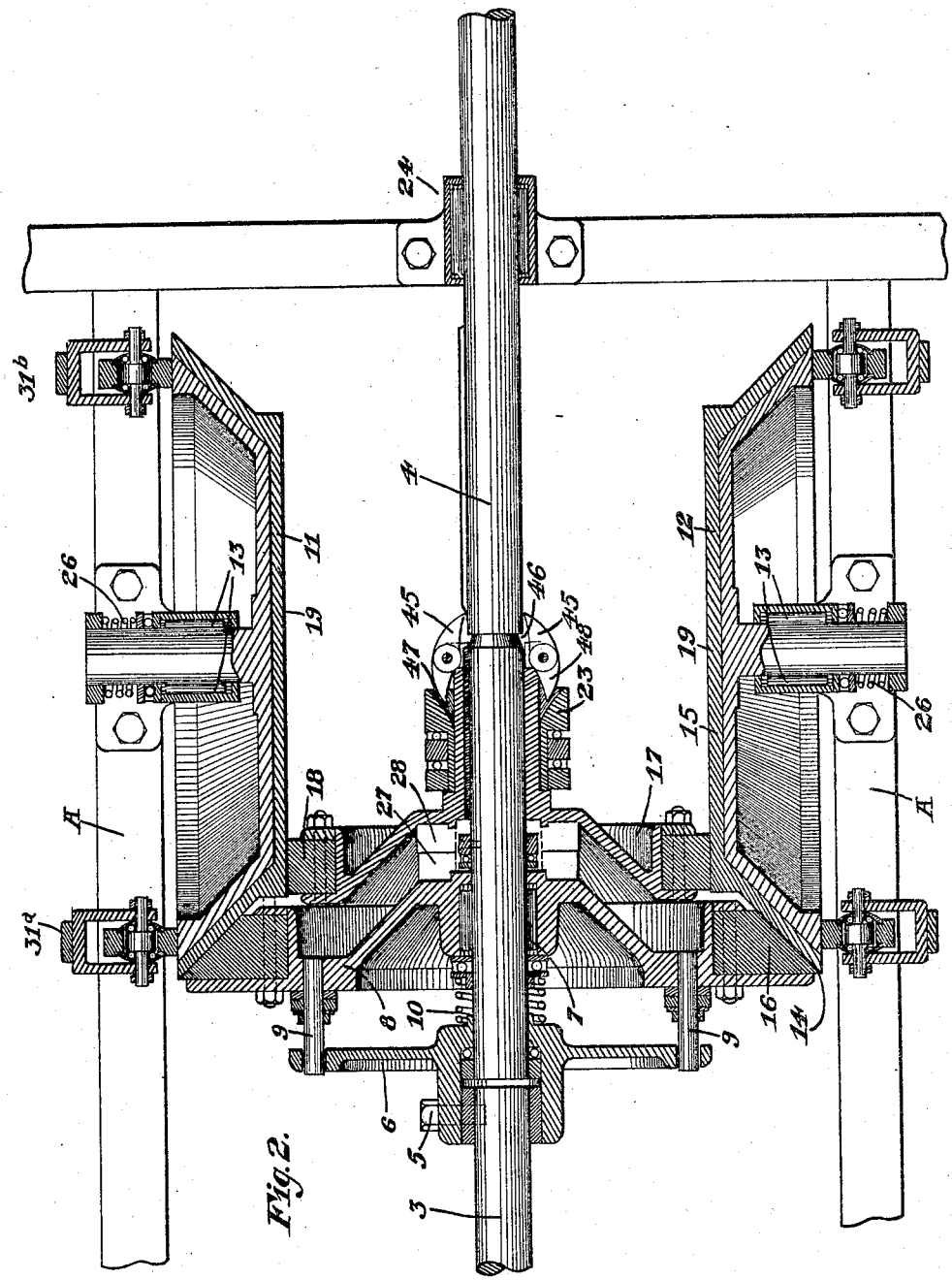

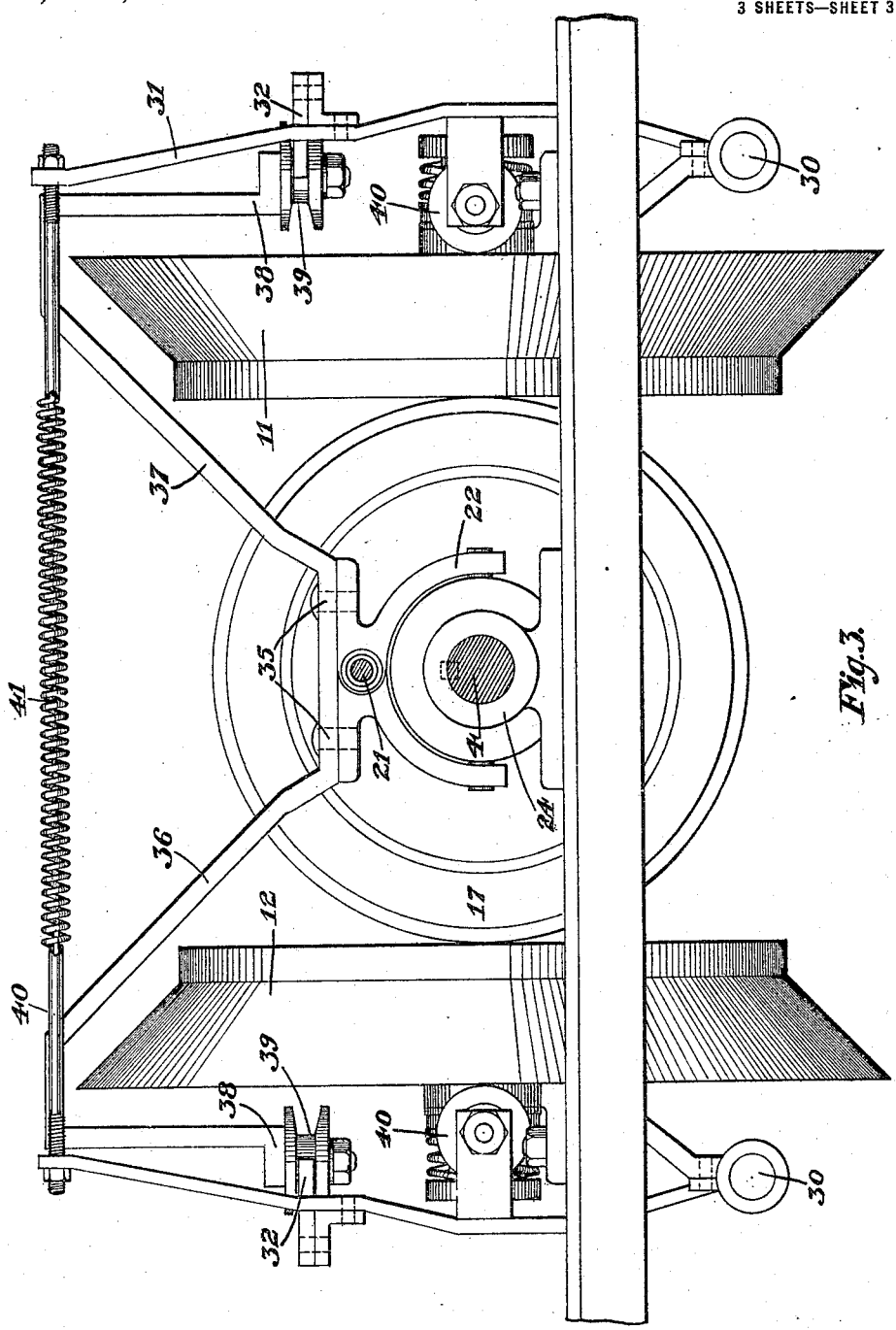

AUGUSTUS MANUEL AND HARRY A. MANUEL, OF ALAMEDA, CALIFORNIA.

TRANSMISSION.

1,187,440.     Specification of Letters Patent.     Patented June 13, 1916.

Application filed June 26, 1915. Serial No. 36,513.

*To all whom it may concern:*

Be it known that we, AUGUSTUS MANUEL and HARRY A. MANUEL, citizens of the United States, residing at Alameda, in the county of Alameda and State of California, have invented new and useful Improvements in Transmission, of which the following is a specification.

This invention relates to a friction transmission.

One of the objects of the present invention is to provide a simple, substantial transmission of the friction type, by which various speeds ahead and reverse may be secured.

Another object of the invention is to provide a clutch mechanism operable in unison with and also independent of the friction drive through which a direct drive may be transmitted and also to provide means for moving the friction disks into and out of engagement with each other, so that these may remain inoperative except when intermediate speeds are transmitted therethrough.

Further objects will hereinafter appear.

The invention consists of the parts and the construction and combination of parts as hereinafter more fully described and claimed having reference to the accompanying drawings, in which—

Figure 1 is a plan view of the transmission. Fig. 2 is a central section in plan view. Fig. 3 is an end view.

The transmission here shown is supported by a frame of suitable construction, indicated at A, in which is journaled a divided shaft indicated at 3 and 4, shaft 3 being connected with the engine and shaft 4 with the rear differential and connected shaft, not here shown. Secured by means of a key or a set screw 5 on the shaft 3 is a flange 6 and mounted on roller bearings 7 on shaft 4 is a main friction driving wheel 8, which is slidably connected with flange 6, by means of studs 9. Interposed between the hub of flange 6 and the hub of the main driving wheel 8 is a coil spring 10, which is provided for the purpose of normally holding the main driving wheel in frictional engagement with a pair of intermediate friction wheels 11 and 12, which are disposed at right angles to the main wheel and supported in roller bearings 13, mounted on the main frame A. The contacting faces of intermediate wheels 11 and 12 and the main driving wheel 8 are beveled as indicated at 14. The face of the intermediate wheels being preferably formed of metal, such as indicated at 15 while the face of the main driving wheel is constructed of paper, fiber, or like material, indicated at 16. Slidably mounted on shaft 4 is a driven friction wheel 17, the outer face of which is also covered with a frictional material, such as paper or fiber indicated at 18. The driven friction wheel 17 engages with the inner faces 19 of the intermediate wheels 11 and 12 and being longitudinally movable or slidably mounted on shaft 4, its position may be changed from one side of the center of the intermediates to the other, or held in any position intermediate thereof, thus permitting various speeds to be transmitted either reverse or ahead. The shifting of the driven friction wheel 17 is accomplished by a rod 21, one end of which is secured to a fork-shaped shifting arm 22 which engages a grooved collar 23, formed or otherwise secured on the hub of wheel 17. The opposite end of the rod extends through and is guided in a bearing 24, which also supports the shaft 4 and any suitable means may be attached to the outer end 25 of rod 21, for the purpose of moving same with connected arm 22 and wheel 17. As this may be accomplished by several forms of mechanism and as it furthermore does not form any part of the present invention, such mechanism has not been shown.

Referring to Figs. 1 and 2 and particularly Fig. 2 it will be seen that the intermediate wheels 11 and 12 are longitudinally movable with relation to the supporting roller bearing 13, and that they are normally held out of frictional engagement with the main driving wheel 8 by coil springs indicated at 26.

One of the objects of the present invention is to provide means for positively locking the main friction wheel 8 and the driven wheel 17 to permit a direct drive to transmit from engine shaft 3 to the drive shaft 4. This is accomplished in the present instance by providing a clutch, one member 27 of which is secured on the main drive wheel 8, while the other member 28 is secured on the wheel 17. This clutch is of standard construction and may be provided with teeth of suitable shape.

A further purpose of this invention is to provide means for separating the several friction wheels when a direct drive is to be transmitted, so that these may run free or idle, except when intermediate speeds for reverse or forward drives are being transmitted. This is accomplished in the following manner: Pivotally mounted on shafts 30, on each side of the main frame A are upwardly extending arms 31, there being two as indicated at 31$^a$ and 31$^b$, on each side of the main frame A. Adjustably secured and horizontally mounted between said arms is a track member 32, one for each pair of arms 31$^a$ and 31$^b$, or in other words one on each side of the main frame A. These track members are cam-shaped, as indicated at 33 and 34, and their function will hereinafter be described. Secured to the fork-shaped shifting member 22 as at 35, is a pair of arms 36 and 37 of a shape approximately such as shown in Fig. 3, and journaled in the lower end 38 of each arm is a sheave-shaped roller 39, which straddles and engages the adjacent cam track 32. A longitudinal movement imparted to wheel 17 through means of rod 21 and the shifting frame 22 causes the rollers 39, when moved along the tracks to engage either cam 33 or cam 34, this being dependent upon the direction in which the shifting frame is moved, as the shifting frame indicated at B comprising arms 36 and 37, and the fork-shaped shifting member 22 is moved to a position where the rollers 39 engage cam 33 they will cause the cam tracks to move outwardly in the direction of arrows $a$, permitting springs 26 to pull the intermediate wheels outwardly or away from frictional engagement with relation to wheels 8 and 17. This position is assumed when wheel 17 is central with relation to the intermediates 11 and 12, or in other words when the car is standing still, and it is desired to either reverse or transmit a forward speed. If it is desired to drive forward, it is only necessary to move the shifting frame in the direction of arrow $b$, this causes rollers 39 to move down or away from the cam sections 33 on the tracks, consequently permitting the tracks to move inwardly and at the same time force the intermediate wheels into frictional engagement with wheels 8 and 17. This being accomplished by means of ball bearing wheels 40, which engage the rear faces of the intermediates, and also by means of crosswise extending springs 41, which pull the cam tracks together, thus causing the intermediates to move inwardly against the tension of springs 26. The first engagement of the intermediate wheels with the main wheels 8 and 17 causes a comparatively slow forward movement to be transmitted to the driving shaft 4, this speed may however, be gradually increased by sliding the shifting frame B forward in the direction of arrow $b$ until wheel 17 reaches its extreme forward movement indicated in Figs. 1 and 2. The two shafts 3 and 4 will in this position revolve in unison as the speed ratio between the several wheels has been designed with this object in view. It is therefore possible to provide the positive jaw clutch indicated at 27 and 28 to form a positive clutch connection between the two shifts to transmit a direct drive. A further forward movement in the direction of arrow $b$ after wheel 17 has reached its extreme limit indicated in Figs. 1 and 2 causes the coöperating parts of the jaw clutch to engage thereby locking the wheels 8 and 17, and permitting same to revolve as a unit. Rollers 39 on the shifting frame at the same time engage the cam sections 34 of the track bars, causing the tracks to move outwardly and permitting springs 26 to retract the connected intermediate wheels, these are thus thrown out of engagement with main wheels 8 and 17, the moment the clutches are thrown into engagement with relation to each other, thus relieving the friction wheels from wear and tear permitting same to stand idle except when intermediate speeds either forward or reverse are to be transmitted. The engagement of the coöperating parts 27 and 28 of the jaw clutch also permits pressure to be brought on the main wheel 8, causing this to move in direction of arrow $b$ a slight distance against the tension of spring 10. The longitudinal movement of wheel 8 is provided for the purpose of taking up any wear between faces 15 of wheels 8, 11 and 12 and also for the purpose of permitting wheels 8 and 17 with connected jaw clutch to move into a position where they may be locked against longitudinal movement as long as a direct drive is to be transmitted. The locking of the jaw clutch with connected wheels against longitudinal movement is accomplished by providing a pair of spring-actuated latch members 45, which engage with an annular shoulder 46 formed on shaft 4, when a longitudinal movement of wheels 8 and 17 on shaft 4 has taken place, or in other words at a time just after the coöperating parts of the jaw clutch have been moved into perfect engagement. The provision of the locking latches 45 takes all strain off the shifting frame and connected operating rod 21, and also prevents accidental release of the jaw clutch when transmitting a direct drive.

For the purpose of releasing the locking latches 45, when it is desired to slow down or to move the friction wheels back into engagement with each other, an annular inclined shaped face 47 has been provided on the outer end of hub or shifting sleeve formed on wheel 17. This face engaging with the inner ends 48 of the locking latches, causes the latches to be released with relation to the groove 46, thereby permitting wheel 17 to be moved back or opposite to the direction indicated by arrow $b$. The tension or frictional engagement of the several friction wheels may be regulated to a large extent by springs 41, which are adjustably mounted as they are supported at their outer ends in screw rods 49. Any wear between the several frictional or contacting faces is thus automatically taken up, and any special mechanism or attention is therefore not required.

The transmission as a whole, is simple and substantial in construction, easy to operate and durable, the friction transmission is only used to transmit intermediate speeds, and is inoperative when a direct drive is being transmitted, thus increasing the life of the mechanism and reducing the wear and tear in general.

The materials and finish of the several parts of the device are such as the experience and judgment of the manufacturer may dictate.

We wish it understood that various changes in form, proportions, and minor details of construction may be resorted to within the scope of the appended claims, and that we do not wish to limit ourselves to the specific design and construction here shown.

Having thus described our invention, what we claim and desire to secure by Letters Patent is—

1. In a power transmission, a driving and a driven shaft journaled in line, beveled friction wheels journaled at right angles with said shafts and upon opposite sides, a beveled wheel loosely mounted and slidable upon the driving shaft and adapted to contact with the said first named wheels, a disk fixed to and turnable with the driving shaft, driving studs extending through said disk from the coacting friction wheel, a spring located between the hubs of the wheel and disk, and a wheel slidable upon the driving shaft and having its periphery in contact with the side faces of the opposed wheels.

2. In a transmission of the character described, a driving and a driven shaft journaled in line, a beveled friction wheel mounted upon the driving shaft, a pair of beveled friction wheels journaled at opposite sides of said driven shaft and at right angles thereto and movable into or out of contact with the first named friction wheel, a disk fixed to the driving shaft, parallel studs extending between the disk and the friction wheel to transmit motion, a flat faced friction wheel slidable upon the driven shaft with its face in contact with the pair of opposed friction wheels, and means to move said wheel along its shaft to contact with the opposed friction wheels at different points of their radial diameter.

3. A power transmitting apparatus of the character described including axially journaled driving and driven shafts, beveled edge friction wheels journaled at right angles with and upon opposite sides of said shaft, a beveled edge friction wheel slidable upon the driving shaft into or out of contact with the first named friction wheels, a disk fixed to the driving shaft, parallel studs connecting the disk with the slidable friction wheel, a spring interposed between the disk and wheel to maintain contact between the frictional wheels, a wheel upon the driven shaft with a flat periphery to contact with the faces of the opposed transverse wheels, and means to transfer said wheel along its shaft.

4. A power transmitting apparatus of the character described including axially journaled driving and driven shafts, beveled edge friction wheels journaled at right angles with and upon opposite sides of said shaft, a beveled edge friction wheel slidable upon the driving shaft into or out of contact with the first named friction wheels, a disk fixed to the driving shaft, parallel studs connecting the disk with the slidable friction wheel, a spring interposed between the disk and wheel to maintain contact between the frictional wheels, a wheel upon the driven shaft with a flat periphery to contact with the faces of the opposed transverse wheels, means to transfer said wheel along its shaft, and means to move the opposed transverse wheels out of contact with said driven wheel while being transferred.

5. In a power transmitting apparatus of the character described, alined driving and driven shafts, a beveled edge friction wheel slidable upon the driving shaft, beveled edge friction wheels journaled at right angles therewith, a disk fixed to the driving shaft, and parallel studs connecting the disk and wheel, an interposed spring to insure contact between the beveled surfaces, a driven wheel slidable upon its shaft having a flat peripheral frictional surface adapted to contact with the side faces of the opposed friction wheels, a guide rod and mechanism by which said wheel may be moved to contact with any portion of the faces of the coacting wheels, and rollers and cam tracks by which the opposed wheels are separated while the intermediate wheel is being transferred.

6. A power transmitting apparatus including alined driving and driven shafts, beveled edge friction wheels journaled transversely to said shafts, a beveled edge driving wheel slidable upon its shaft, and a driving disk and interposed spring, a driven wheel, the peripheral face of which coacts with the side faces of the first named opposed wheels, spring-pressed rollers by which the said wheels are kept in contact with the driven wheel, and cam tracks and travelers by which said friction wheels are separated and withdrawn from contact with the driven wheel.

7. In a transmission, a frame, a divided shaft comprising a driver and a driven shaft journaled in said frame, a main driving friction wheel turnably and slidably mounted on the driving shaft, a disk flange secured on the driving shaft, a stud driving connection between the flange and main driving friction wheel, a pair of intermediate friction wheels, one on each side of the main friction wheel, means for moving said intermediates into and out of driving engagement with the main friction wheels, a driven friction wheel on the driven shaft engageable with the intermediate wheels, and means to separate said intermediates and disengage them from driving connection.

8. In a transmission, a frame, a divided shaft comprising a driver and a driven shaft journaled in said frame, a main driving friction wheel turnably and slidably mounted on the driving shaft, a disk flange secured on the driving shaft, a sliding stud driving connection between the flange and main driving friction wheel, a pair of intermediate friction wheels, one on each side of the main friction wheel, a driven friction wheel keyed and slidable on the driven shaft, engageable with and driven by the intermediate wheels, a sliding frame connected with the driven friction wheel, and means carried by the sliding frame for moving the intermediate wheels into and out of engagement with the main driving friction wheel and driven friction wheel.

9. In a transmission, a frame, a divided shaft comprising a driver and a driven shaft journaled in said frame, a main driving friction wheel turnably and slidably mounted on the driving shaft, a disk flange secured on the driving shaft, a slidable stud driving connection between the flange and main driving friction wheel, a pair of intermediate friction wheels, one on each side of the main friction wheel, a driven friction wheel keyed and slidable on the driven shaft engageable with and driven by the intermediate wheels, a sliding frame connected with the driven friction wheel, means carried by the sliding frame for moving the intermediate wheels into and out of engagement with the main driving friction wheel and driven friction wheel, said means comprising a pair of arms pivotally mounted adjacent the rear side of each intermediate wheel, a cam track secured in each pair of arms, rollers on the sliding frame engageable with the cam tracks, rollers on the cam track supporting arms engageable with the rear faces of the intermediate wheels, and springs connecting each pair of arms.

In testimony whereof we have hereunto set our hands in the presence of two subscribing witnesses.

AUGUSTUS MANUEL.
HARRY A. MANUEL.

Witnesses:
CHAS. W. MACRAE,
A. CULVER.

Copies of this patent may be obtained for five cents each, by addressing the "Commissioner of Patents Washington, D. C."